United States Patent [19]
Impicciche

[11] 3,897,608
[45] Aug. 5, 1975

[54] HINGE-LIKE DEVICE FOR CONTROLLING THE INCLINATION OF MOTOR VEHICLE SEAT BACKS

[76] Inventor: Agostino Impicciche, Via Vistrorio 27, 10155 Turin, Italy

[22] Filed: Dec. 20, 1973

[21] Appl. No.: 426,868

[30]   Foreign Application Priority Data
  Dec. 22, 1972  Italy.................. 71052/72
  Mar. 16, 1973  Italy.................. 67760/73

[52] U.S. Cl. ............................................. 16/145
[51] Int. Cl.² .................................... E05D 11/10
[58] Field of Search .......... 16/145, 139, 147, 144

[56]         References Cited
         UNITED STATES PATENTS
3,643,292  2/1972  Mayer.................... 16/144
3,737,946  6/1973  Giuliani................... 16/139
3,788,698  1/1974  Perkins................ 16/139 X FOREIGN PATENTS OR APPLICATIONS
564,211  7/1957  Italy..................... 16/144

*Primary Examiner*—Richard J. Scanlan, Jr.
*Attorney, Agent, or Firm*—Alan H. Levine

[57]              ABSTRACT

Two mutually hinged box-like elements are provided, one fixed to the side of a seat and the other to the side of a seat back. A toothed wheel is fixed within one of the elements and is engageable by a toothed sector carried by a slide within the other element. The slide is resiliently biased toward the toothed wheel, to lock the two elements together, but may be moved away from the wheel by operation of a handle. The seat back is spring biased toward a forward position above the seat.

4 Claims, 8 Drawing Figures

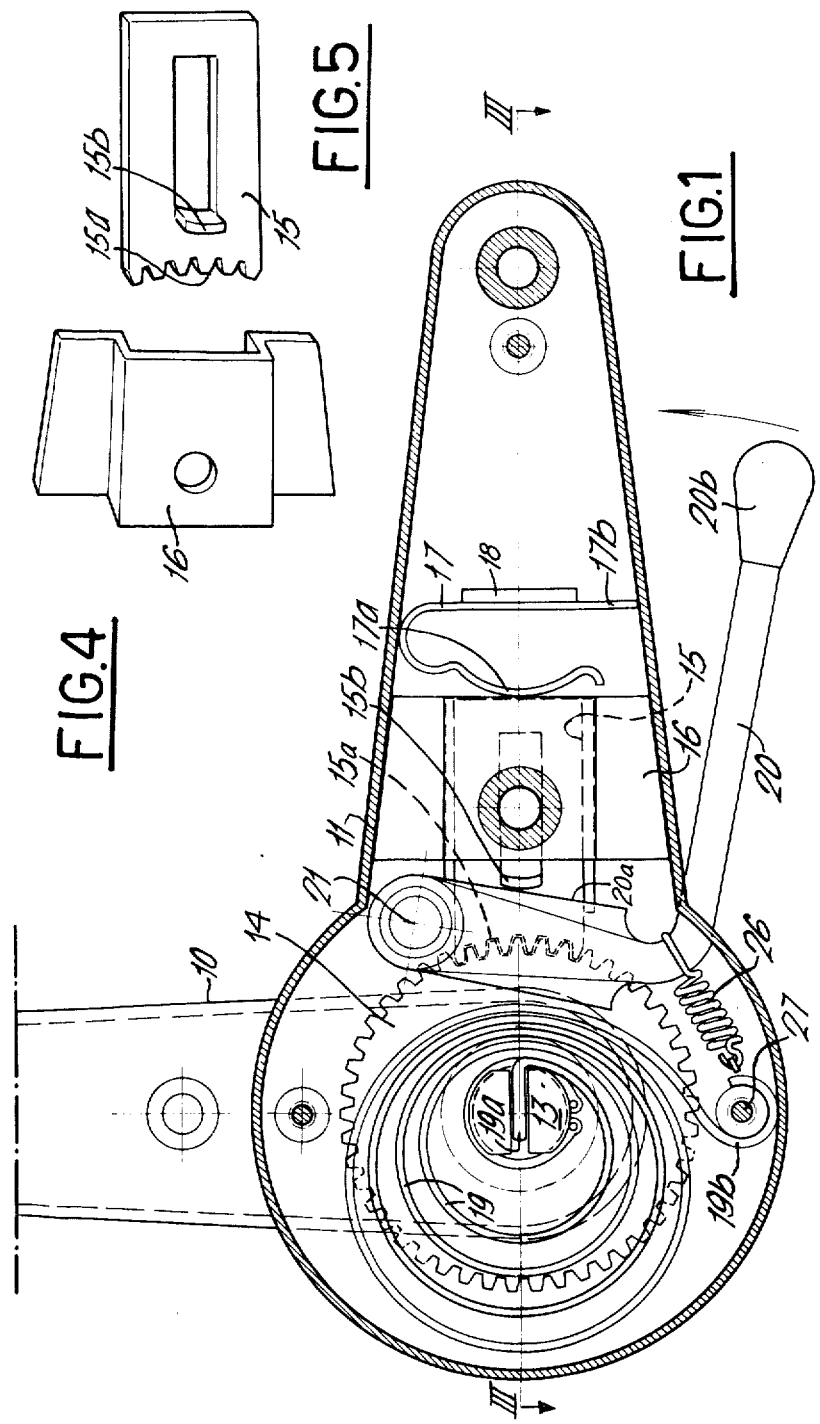

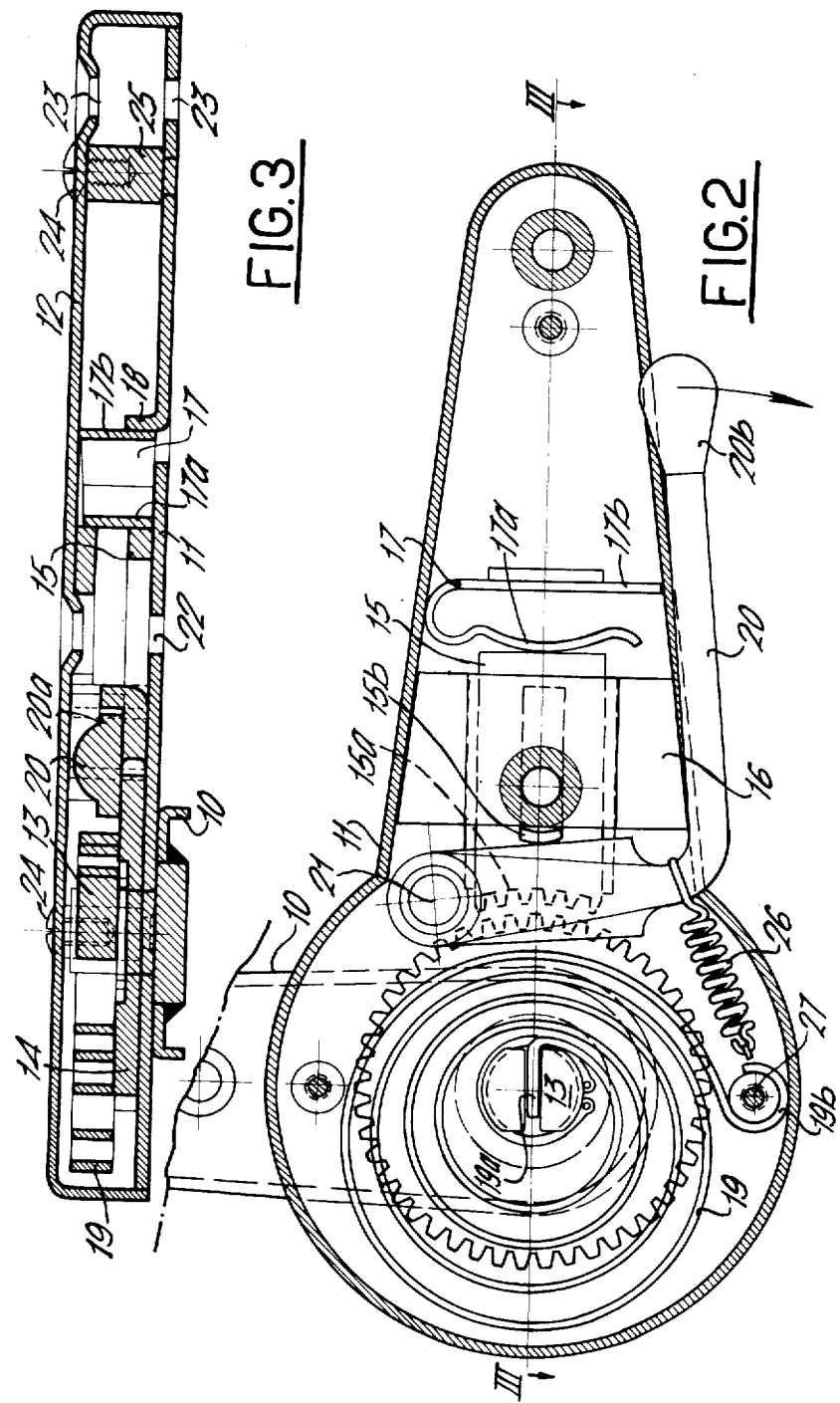

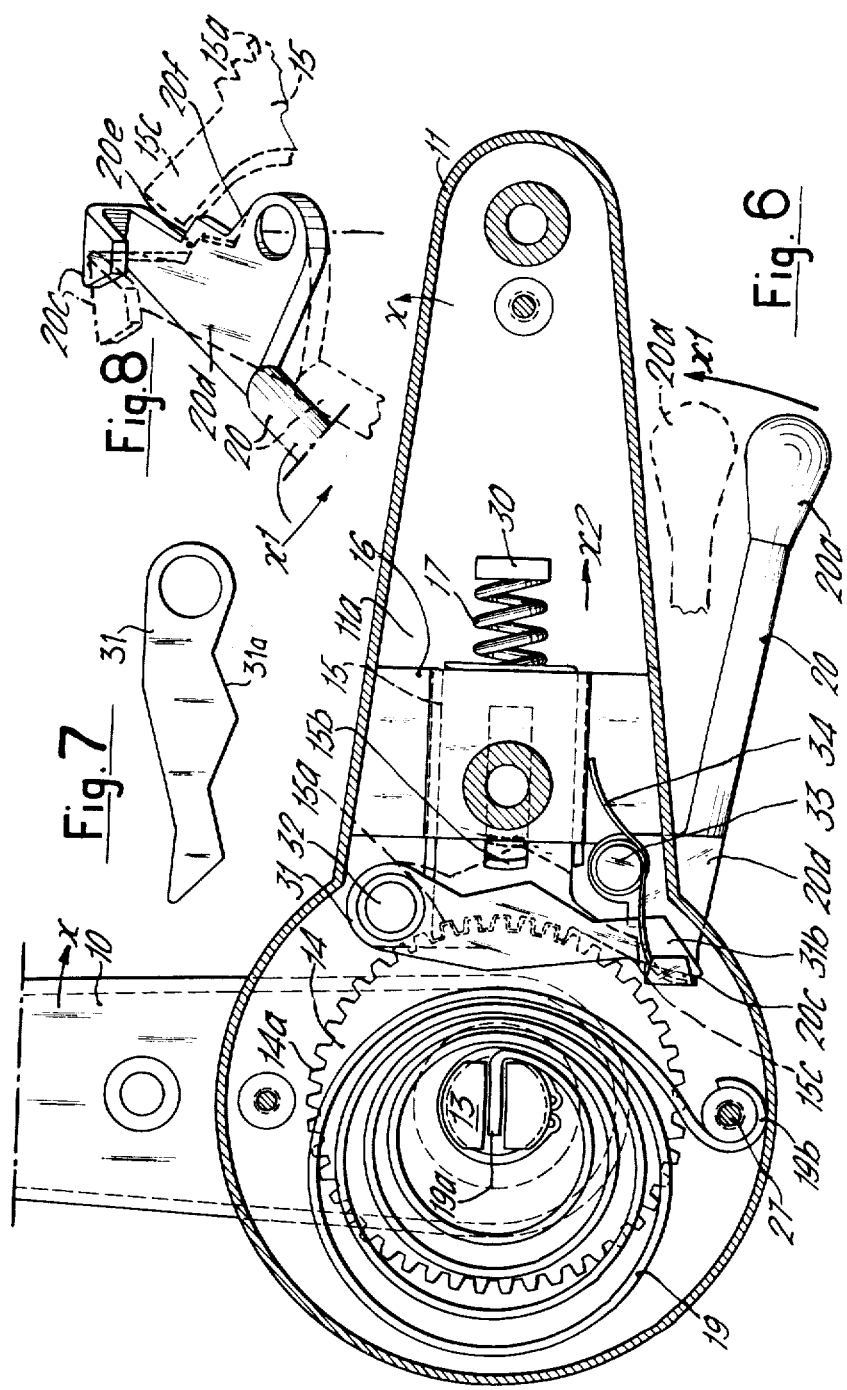

HINGE-LIKE DEVICE FOR CONTROLLING THE INCLINATION OF MOTOR VEHICLE SEAT BACKS

It is known that motor vehicle, particularly the automobile, front seats are provided with variable inclination backs. In order that inclination of the seat back be variable to the extent that the back may reach a backward lowered position coplanar with the seat, each seat is articulated with respect to the back by means of a device comprising at least one hinge and including gears controlled by a hand operated member, located on a side of the seat.

The main object of the present invention is to provide a hinge-like device of the above mentioned type which assures reliable operation and a reasonable cost.

Another object of the invention is to provide a hinge-like device of reduced dimensions which is applicable to the seats of any type of motor vehicle.

While the device is particularly adapted for application to motor vehicle seats, it may also be applied to chairs, and easy chairs, in general, out of the automotive field.

With the above-mentioned objects in view, the device according to the invention is substantially characterized by a structure, comprising two box-like elements mutually hinged, and intended to be applied, one on the horizontal side of the seat and the other on the side or upright of the back; a toothed wheel integral with one of said elements; a toothed sector engaging said wheel and radially movable with respect to the same, controlled by a suitable elastic means and releasable from the wheel by means of a hand actuated lever; a wound helicoidal spring whose elastic reaction tends to bring the back into a forwardly lowered position above the seat.

Other particular features will appear from the following specification which refers to the drawings which are annexed only as demonstrative examples, and wherein:

FIG. 1 is a partial vertical section through the device with the gears in a meshed condition;

FIG. 2 is analogous to FIG. 1 and illustrates the device with the gears in a disengaged condition;

FIG. 3 is a longitudinal sectional view of the device, along line III—III of FIG. 2;

FIGS. 4 and 5 are perspective view of details which will be described later;

FIG. 6 is similar to FIG. 1 and illustrate a variant of the device;

FIG. 7 is a plan view of the intermediate member located between the control lever and the slide with the toothed sector, according to the FIG. 6 variant; and FIG. 8 is a perspective view of a detail of the control lever.

Referring to FIGS. 1 to 5, the device according to the invention comprises two box-like bodies 10 and 11, controlled by suitable covers (only one of them being indicated and visible on FIG. 3) and mutually articulated by means of a pivot 13 integral with body 10 and rotatably passing through body 11.

Secured to pivot 13, and hence to body 10, is a toothed wheel 14 which meshes with the toothed sector 15a of slide 15. Slide 15 is slidably mounted in the body 11, a bracket 16 being located astride it to prevent any transverse movement of the slide 15, but not its longitudinal sliding movement.

A leaf spring 17 constantly pushes the slide 15 with its free branch 17a, in a direction to cause engagement of sector 15a with the crown of wheel 14. Branch 17b of spring 17 is fixed to stop 18 which is a part of body 11 or integrally coupled to it.

A spiral spring 19 has one end 19a engaging the pivot 13 and the other end 19b engaging a stop 27 integral with body 11.

The slide 15 is provided with a tooth 15b engaged by edge 20a of crank lever 20. The latter is rotatably pivoted at 21 with respect to body 11 and provided with a handle 20b. A return spring 26 is provided for lever 20.

Holes 22 and 23, in FIG. 3, are provided for the fastening body 11 to the side of a seat and analogous holes are provided in body 10. Screws 24 accommodated by seats 25 clamp the corresponding covers with respect to the bodies 10 and 11.

The operation of the device will be obvious when body 10 has been fastened to the side upright of the seat back and body 11 fastened to the corresponding side of the seat, to adjust the inclination of the back with respect to the seat, it is sufficient to grasp the handle 20b of lever 20 and, by pulling it upwardly, to overcome the reaction of spring 26, and displace the lever 20 from its FIG. 1 position to its FIG. 2 position. Due to this movement, the edge 20a of the lever engages tooth 15b of slide 15 and slides it against the force of spring 17, disengaging at the same time the toothed sector 15a of the slide from the crown of wheel 14. In the position represented on FIG. 2, the seat back is free to pivot about a horizontal axis of the pivot 13. The spiral spring 19 tends to bring the seat back forwardly towards the seat and therefore the person occupying the seat, by moving his body back and forth, determines the preferred inclination of the seat back and then he releases lever 20. The action of spring 17 returns the slide 15 to the position represented in FIG. 1. The action of the spring 26 returns lever 20 to its initial position and therefore the toothed sector 15a of slide 15 meshes again with the crown of wheel 14. This locks wheel 14 together with body 10 and the seat back to which that body is fastened.

The presence of the toothed wheel 14 cooperating with teeth 15a of slide 15 allows the seat back to rotate through more than 180° in the two directions around the axis of pivot 13, but this rotation is limited by the front and the rear seats.

With reference to FIGS. 6 to 8, the parts which are similar or corresponding to the parts already described are indicated by the same reference numerals. Instead of a leaf spring 17a, helical spring 17' arranged between a stop 30 and the rear edge of the slide 15, assures the engagement between the crown 14a of wheel 14 and the toothed sector 15a.

The slide 15 is provided with tooth 15b which may be engaged by the profile 31a of lever 31 pivoted at 32 to the bottom of body 11. Lever 31 has an end 31b engaged by the hook 20c of the lever 20 provided with a terminal knob 20a. Base 20d of lever 20, pivoted at 33, presents a stepped side profile 20e, 20f (FIG. 8).

Slide 15 is provided with an appendage 15c which, when the lever 20 is in its rest position, engages step 20e of base 20d and clamps the slide 15 in a position of stable engagement determined by the toothed sector 15a with the crown of wheel 14.

The operation of the device is as follows:

by moving lever 20 in the direction indicated by arrow x1 (FIG. 6), base 20d is caused to pivot around the axis of pivot 33. This pivots lever 31 about the axis of pivot 32, and edge 31a engages tooth 15b of slide 15. The latter is forced to slide against the force of spring 17, in the direction of arrow x2. At the same time, the appendage 15c releases its clamping engagement of step 20e because the base 20d of lever 20 brings, by its pivotal movement, the step 20f into alignment with the appendage 15c. Appendage 15c slides together with the slide 15, of which the appendage is a part. The sliding movement of slide 15 releases the toothed wheel 14 and, therefore, by acting on the seat back, connected to the body 10, its inclination may be controlled as described above. When the lever 20 is released, the various members of the device return automatically in the positions shown in FIG. 6. The spring 34 reacts to the oscillations imposed upon lever 20 and returns the lever in its rest position. Spring 17 pushes the slide 15 to its meshing position with wheel 14 and therefore, the articulation of the elements 10 and 11 is again locked, with the appendage 15c in the security position assured by step 20e.

From the foregoing, it is clear that this variant is characterized by a security member which prevents any movement, which is not controlled, between the two hinged engaged parts.

The spring 34 to return lever 20 to its rest position, may be shaped differently from the represented from, and retaining means not shown are contemplated with the purpose of preventing axial movements of levers 20 and 31 with respect to the corresponding pivots.

What is claimed is:

1. A hinge-like device for adjusting the inclination of the back of a seat with respect to the seat, comprising:
   a. a body fixed to the seat, a body fixed to the seat back, and a pivot connection between said two bodies,
   b. a toothed wheel fixed to a first one of said bodies coaxial with the axis of said pivot connection,
   c. a slide slidably mounted on a second one of said bodies, said slide having a toothed sector adapted to mesh with said toothed wheel to prevent relative movement between said two bodies, and said slide having a tooth and an appendage,
   d. resilient means constantly urging said slide in a direction to maintain engagement between said toothed wheel and said slide toothed sector,
   e. a lever pivotally mounted on said second body, said slide tooth being in the path of pivotal movement of said lever, and
   f. a handle pivotally mounted on said second body and movable between a normal position, in which relative movement between said two bodies is prevented, and an actuated position, in which relative movement between said two bodies is permitted, said handle having means engaging said lever to pivot the latter against said slide tooth and move said slide away from said toothed wheel when said handle is moved from its normal to its actuated position, and said handle having an abutment arranged in the path of movement of said slide appendage when said handle is in its normal position to prevent movement of said slide in a direction away from said toothed wheel, said abutment moving out of the path of said slide appendage when said handle is moved to its actuated position.

2. A hinge-like device as defined in claim 1 wherein said lever-engaging means of said handle includes a hook carried by said handle.

3. A hinge-like device as defined in claim 1 wherein said abutment forms part of a stepped profile edge of said handle.

4. A hinge-like device as defined in claim 1 including resilient means constantly urging said handle toward its normal position.

* * * * *